UNITED STATES PATENT OFFICE 2,530,492

METHOD OF MAKING INCENDIARY COMPOSITIONS

William F. Van Loenen, Los Altos, Calif., assignor, by mesne assignments, to Kaiser Aluminum & Chemical Corporation, a corporation of Delaware No Drawing. Application September 25, 1944, Serial No. 555,769

1 Claim. (Cl. 52—24)

The present invention relates to an incendiary composition and to a method of preparing the same, and more particularly to an incendiary formed by destructively distilling a carbothermic dust-hydrocarbon mixture to provide a coked mass containing discrete particles of magnesium.

In my copending application Serial No. 492,989, filed July 1, 1943, now Patent No. 2,509,710, I have set forth the production of magnesium metal from magnesium oxide by carbothermic reduction according to the process disclosed in Patent No. 1,884,993 (Hansgirg). Therein a mixture of magnesium oxide and carbon is converted into magnesium vapor and carbon monoxide by the heat of an electric arc furnace. This gaseous mixture is discharged from the region of the arc at a high enough temperature (above 1800° C.) that reversal of the reaction does not occur, and is then suddenly cooled and diluted by injecting large volumes of a shock chilling agent, which may be hydrogen, natural gas, hydrocarbon vapor or even a spray of liquid hydrocarbon.

In one particular practice of the process natural gas is employed. The magnesium vapor is condensed to magnesium metal in the form of extremely fine dust. Some of the vapor recombines with carbon monoxide with the result that the solid material precipitated in the condensing chamber comprises a substantial proportion from 30 to 65% of magnesium dust with the remaining 70 to 35% comprising carbon, magnesium oxide and other impurities. A typical sample of a normal run shows 47% by weight of magnesium metal dust.

This condensate, i. e., the magnesium dust with admixed impurities, while it requires coalescing of the magnesium dust to produce compact metal, is, nevertheless, highly pyrophoric, and will combust spontaneously when exposed to the atmosphere. To diminish this tendency so that the material may be safely handled for sublimation into crystalline magnesium metal, it is now customary to wet the precipitate with a light hydrocarbon oil having a flash point above 100° F., with or without the addition of asphalt to produce a relatively stiff plastic mass known as carbothermic magnesium paste. The asphalt is added when it is desired to make the mass somewhat cohesive, particularly where it is desired to tablet the material into compact pellets or briquettes. Where the shock chilling is produced by oil spray, the shock chilling oil wets the precipitate and inhibits ignition while forming carbothermic magnesium paste.

The average analysis of the magnesium dust is:

| | Per cent |
|---|---|
| Magnesium | 50 |
| Carbon | 19 |
| Inert (principally MgO) | 31 |

A small percentage of the magnesium (approximately 5%) exists as one or both of the carbides—$MgC_2$ and $Mg_2C_3$. There is generally a trace of sodium which is believed to be in elemental form and possibly minor traces of other carbides such as calcium, silicon and aluminum originating from the ash constituents from the metallurgical coke in the reduction furnace and/or from the minor ash constituent in the petroleum coke used for reduction. With the exception of occasional carry over of particles from the reduction furnace all of these materials have an ultimate particle size below the resolving power of optical microscopes. Electron microphotographs reveal agglomerates several microns in diameter and ultimate particles in the neighborhood of 0.1 micron.

The hydrocarbons which may be employed for wetting the magnesium dust may advantageously consist of 50% by weight distillate and 50% by weight asphalt which is a well-distilled or solvent-extracted residue of an uncracked asphalt-base oil. A typical analysis of the hydrocarbons is as follows:

Distillate

| | |
|---|---|
| Gravity, °API at 60° F | 23 |
| Flash point Pensky-Marten closed cup __° F __ | 180 |
| Viscosity Saybolt seconds Universal at 100° F | 60 |

Asphalt

| | |
|---|---|
| Gravity, °API at 60° F | 10.2 |
| Flash point Pensky-Marten closed cup __° F __ | 430 |
| Viscosity Saybolt seconds Furol at 210° F ___ | 145 |

To produce a mixture of dust and hydrocarbons, safe for shipment and suitable for compounding incendiary fuels, the shock chilled dust is conveyed in a closed atmosphere under natural gas to pug mill type extrusion presses where it is thoroughly mixed with the desired hydrocarbons and extruded through a die plate into open drums. The limitations on this equipment are such that practical concentrations can be made between 55% and 70% by weight solids, the balance hydrocarbons. For reasons of safety it is undesirable to include low flash hydrocarbons at this stage. Various mixtures of fuel oils, or asphalt cut-back with fuel oils, or kerosenes in a considerable range, are practical from a production standpoint. This magnesium material when thoroughly wetted with hydrocarbons is not easily ignited nor will it flash or explode. However, if allowed to air dry or come in contact with water, acids, or perspiration, it will sooner or later ignite when such liquid has cut through the protective layer of hydrocarbon so as to react with the finely divided magnesium.

The construction of well known incendiaries, particularly those of the known "stick" form, involves the use of cast solid magnesium metal which is difficult to ignite except by thermite or a similar igniting charge. Incendiaries and flares of magnesium powder have therefore been made by first producing magnesium in solid metal form and then subdividing it. By my method the raw powder coming from the shock chilling step of the carbothermic process may be directly substituted for the more expensive method hitherto employed for preparing incendiary magnesium material.

According to my invention the magnesium powder even in the impure form as recovered from the vapor produced by carbothermic reduction, and with or without other materials, may be directly applied to incendiary use without going through the stage of first producing the coalesced or solid metal. A great advantage of using such a finely divided metal is that the desired ignition may be secured from mere contact with such simple media as water or other oxidizing liquid. Any substance which gives up oxygen freely enough to produce ignition, i. e., rapid combustion, may be used.

The finely divided magnesium produced in the carbothermic process has a particle size of substantially less than one micron, and as heretofore stated is capable of spontaneous combustion with the atmosphere unless protected against such action. It is obvious that a particle size on the order of that mentioned cannot be achieved on a commercial scale by use of mechanical means. The fine particles, because of their pyrophoric qualities, would present a considerable fire hazard if mechanically produced, and the high cost and complicated equipment necessary to mechanically produce such particles in an inert atmosphere would be impractical. Thus additional advantages of this invention are that it utilizes as starting material for an incendiary product finely divided magnesium of a particle size never before attainable on a commercial scale, and yet such finely divided magnesium is capable of rapid and economic production, and can be safely handled.

Magnesium and/or aluminum, including alloys thereof, in the form of solid metal either as a part or all of the container, or an admix in the form of borings, turnings, screenings, or pieces of scrap metal, may be used in conjunction with the product of this invention and may partake of the incendiary reaction, after the same is initiated.

An additional feature of the invention is that the finely divided magnesium dust is colloidal in nature and can be readily incorporated to form a fortified hydrocarbon gel type incendiaries with good results in sharp contrast to mechanically comminuted magnesium which does not give good results. In the use of carboethermic magnesium paste with the gels or alone there is an additional advantage that the reaction between the colloidal magnesium particles and the oxidizing liquid takes place progressively throughout the mass to liberate great quantities of heat to destructively distill the hydrocarbons in admixture therewith and give off large quantities of inflammable gases with sufficient violence to induce air circulation and mixing to thereby burn the gases substantially to completion. It is to be noted that the use of heavy hydrocarbons is advantageous in that they have a higher heat of combustion on a volume basis than light hydrocarbons, which is important in many instances, e. g. the storage capacity of an airplane. Another point of importance is that the generation of gases within the asphaltic mass of the incendiary yields a swelling ash which is useful.

The present invention is a continuation-in-part of my application Serial No. 492,989, filed July 1, 1943, now Patent No. 2,509,710.

The primary object of this invention is to provide an incendiary product formed by destructively distilling a mixture of materials including magnesium in pyrophoric form as an active ingredient thereof, and a hydrocarbon material, either solid, semi-solid or liquid.

Another object is to prepare an incendiary composition by coking the mixture of the crude magnesium dust resulting from the reduction of magnesia with carbon and a hydrocarbon material, wherein the coked mass contains discrete particles of magnesium.

In carrying out the preferred practice of the invention, the carbothermic dust is first prepared, and recovered as hereinbefore described in the thermal reduction of magnesia by a carbonaceous reducing agent. The carbothermic dust is treated or admixed with a hydrocarbon material. This dust-hydrocarbon mixture is then destructively distilled to yield a coked mass containing discrete magnesium particles visible to the naked eye.

In the practice of the process, the carbothermic dust or paste may contain only a liquid hydrocarbon, preferably one having a flash point over 100° F. If desired, the carbothermic dust or paste may be modified with a mixture of liquid hydrocarbon and a semi-solid hydrocarbon, a mixture of liquid hydrocarbon and a solid hydrocarbon, a semi-solid hydrocarbon alone, or a solid hydrocarbon alone. The semi-solid or solid hydrocarbons may be tar products, pitch or any petroleum residue of proper consistency to mix with the carbothermic dust or paste.

It is preferred to employ a fairly fluid hydrocarbon in treating the magnesium dust, as it is important that the dust particles be coated quickly with a protective liquid to decrease chemical activity so as to make it more convenient for handling.

The next step in the process is the destructive distillation of the dust-hydrocarbon mixture to provide a coked mass containing discrete magnesium particles visible to the naked eye. Any suitable apparatus may be employed in the destructive distillation step, though it is preferred to use apparatus having means for controlling temperatures within certain limits.

In the destructive distillation step, it is believed that some agglomeration of magnesium particles occurs. This is so even though the distillation is carried out at temperatures below the melting point, about 650° C. or 1200° F., or volatilization point, about 1100° C. or 2000° F., of magnesium. The coking of the carbothermic dust-hydrocarbon mixture usually begins at a little over 750° F.

In an example of the preparation of this material, the carbothermic paste is made up by admixing carbothermic dust with a hydrocarbon comprising 70% by weight of distillate and 30% by weight of asphalt. The well-blended paste is formed into pellets of about ¾ inch in diameter and 1.5 inches in length. These are then dried at a fairly low temperature and are then introduced into a coking zone of an oven where they are heated to cause coking, and incipient agglomeration of the magnesium present. Distillation being at about 750° F. and most of the oil is driven off by 800° F. Heating is continued and the temperature is maintained at 850°–900° F. for about an hour, after which the pellets are removed and cooled. They readily ignite in the presence of water or other liquid oxidizing agent and when filled into suitable containers are useful as water-borne flares.

The hydrocarbon material may be present in varying proportions by weight relative to the weight of the magnesium dust. Generally 10%–30% by weight of asphalt-distillate mixture is suitable. It is desired that sufficient hydrocarbon be present by weight relative to the magnesium dust, that the discrete particles of magnesium formed in the cooling operation are dispersed in the coked mass in such amount that ignition occurs in the presence of an oxidizing liquid.

Agglomeration of the magnesium into discrete particles of a size to be visible in a cross-section of the pellet occurs generally at 850°–900° F. It is not desirable to heat until the magnesium melts and flows together into too large agglomerates as the resulting product would be rather unstable and more difficult to handle.

The new coked product is relatively stable in air, particularly dry air. It will ignite immediately upon contact with water, or other oxidizing liquid. There are probably two principal sources of flame with this material. The magnesium combines with water to give magnesium oxide or hydroxide, liberating hydrogen which is then available for combustion to give a long flame, and at the same time the carbon of the coked mass is ignited and burns in the oxygen of the available air to give carbon dioxide.

The advantages of the coked incendiary material of the invention are many. For example, to create effective incendiary conditions, the coked mass is brought into contact with water, or other oxidizing liquids, and ignition occurs immediately. In igniting oil slicks, there is no need to add solid oxidizing agents or a metal carbide, or the like to the mass, as additional flame promoters. The easy ignitability of the coked mass when brought in contact with water, may be due to the presence of the discrete magnesium particles. Some magnesium carbide may be formed in situ during the coking operation.

It is to be understood that after the coked product is once ignited, it will continue to burn by reaction with the oxidizing liquid and/or the oxygen and/or nitrogen of the air or other media capable of giving up oxygen, and by the heat and flame produced ignites adjacent combustibles. When the oxidizing liquid, usually water, for example, produces ignition, the resulting gas, such as hydrogen, is combustible and tends to spread the fire.

Other oxidizing liquids available for the reaction also tend to spread the fire by producing a flame reaching into adjacent space for oxygen to support its combustion. Other oxidizing liquids than water will initiate the reaction, as, for example, alcohols such as methanol, aldehydes, organic acids and the like so that combustion can be created in many media.

It is preferred to provide small pellets of the coked incendiary material to increase the available area for contact with the oxidizing liquid to promote early reaction and ignition. However, various sizes of pelleted coked incendiary material may be employed. Larger sizes of pellets may be used in "sleeper" incendiary bombs, e. g., for igniting oil slicks. In the "sleepers" ignition does not occur immediately but in a period of 2–4 minutes.

Any suitable container may be employed for the coked incendiary charge. In the incendiary bomb, any container may be used having means for bringing the coked incendiary composition into reactive contact with water, or any other oxidizing liquid, to cause ignition. The invention embraces a method of creating incendiary conditions including the step of bringing a coked magnesium-hydrocarbon mass into an oxidation-reduction reaction with an oxidizing liquid, preferably water. The magnesium is preferably the magnesium dust formed in the reduction of magnesium with carbon. However, magnesium in any pyrophoric form may be employed, as long as it is compatible with the hydrocarbon material to yield a coked incendiary product upon destructive distillation.

The main concept of this invention embraces the features of a coked incendiary mass and a method for providing a coked incendiary mass comprising the destructive distillation of an admixture of magnesium in pyrophoric form and a hydrocarbon material, and a method of creating incendiary conditions comprising the step of bringing the said coked incendiary mass into reaction with an oxidizing liquid, such as water.

By the term "carbothermic condensate" it is intended to mean the material which is recovered from the reduction of a magnesium compound, such as magnesia, with a carbonaceous reducing agent, such as coke, coal, carbon or the like, by sharp quenching of the vaporous products of reaction. This material may be in the form of a dust, as when a gaseous quenching agent is used, or it may be obtained directly as a mud when the quenching agent is an inert liquid such as a hydrocarbon oil. Such a mud may have sufficient hydrocarbon present to give the desired coked mass upon coking but it may be advantageous to add more or different hydrocarbon material prior to coking.

It is to be understood that the term "incendiary" as used herein is not intended to be limited to incendiaries as applied to bombs or the like, but instead is intended to include any application wherein such material is useful, such as fireworks, flares, signals, etc.

The incendiary of the invention is ideal in many applications because it vastly increases the chances of self-sustaining combustion.

I claim:

A method of making an incendiary material which comprises, admixing carbothermic magnesium dust with from 10% to 30% by weight of a hydrocarbon comprising 70% distillate and 30% asphalt, forming pellets of the said admixed materials, drying the pellets at a temperature substantially below the coking temperature of the hydrocarbon, and coking the pellets at a temperature substantially between 850°–900° F. for about an hour.

WILLIAM F. VAN LOENEN.

REFERENCES CITED

The following references are of record in the file of this patent:

UNITED STATES PATENTS

| Number | Name | Date |
|---|---|---|
| 841,172 | Nienstadt | Jan. 15, 1907 |
| 1,308,463 | Webb | July 1, 1919 |
| 1,399,953 | Fulton | Dec. 13, 1921 |
| 1,943,601 | Hansgirg | Jan. 16, 1934 |
| 2,328,202 | Doerner | Aug. 31, 1943 |

FOREIGN PATENTS

| Number | Country | Date |
|---|---|---|
| 124,796 | Great Britain | Apr. 10, 1919 |
| 492,888 | Great Britain | Sept. 28, 1938 |